Oct. 9, 1951          J. J. DIGBY          2,571,018
ENGINE STARTER GEARING
Filed May 1, 1950
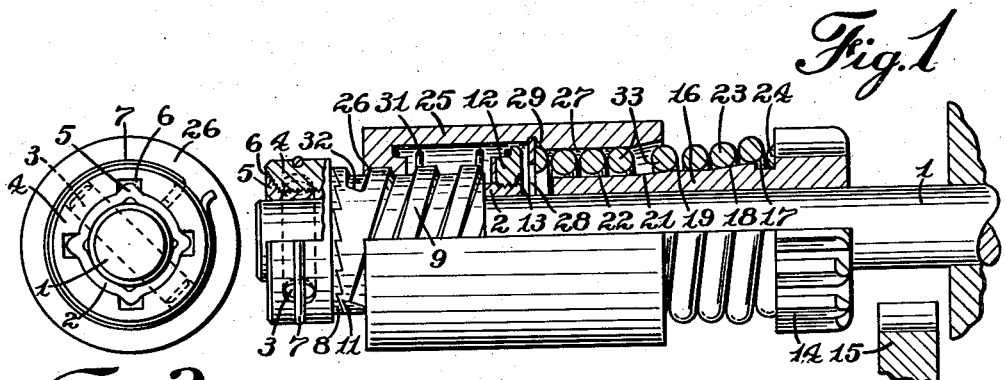
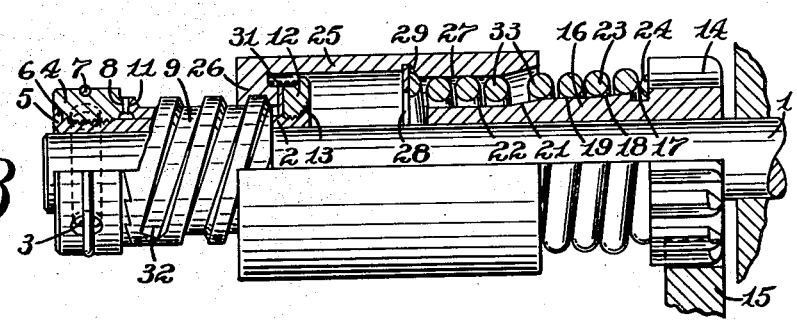
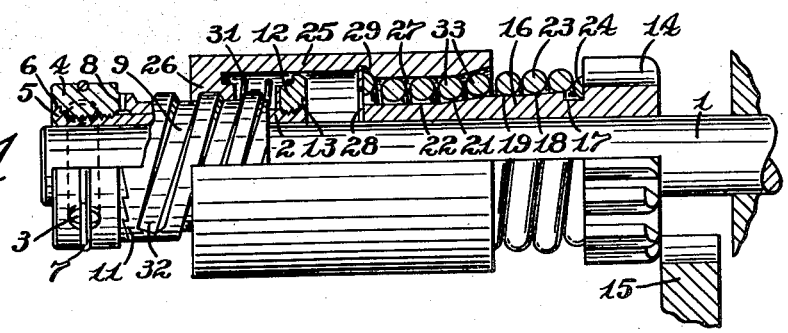
WITNESS:
INVENTOR.
James J. Digby
BY
ATTORNEY Patented Oct. 9, 1951

2,571,018

UNITED STATES PATENT OFFICE 2,571,018

ENGINE STARTER GEARING

James J. Digby, Elmira, N. Y., assignor to Bendix Aviation Corporation, a corporation of Delaware Application May 1, 1950, Serial No. 159,331

6 Claims. (Cl. 74—7)

The present invention relates to engine starter gearing, and more particularly to a self-contained starter drive unit which embodies provisions for preventing overloading, jamming or rebounding of the drive.

It is an object of the present invention to provide a novel drive of the character indicated which is small, particularly in radial dimensions, while being adequate in torque capacity, and simple and economical in construction.

It is another object to provide such a device incorporating a yielding and torque-limiting coupling element which is of small radius, and is located in direct engagement with the pinion so as to reduce to a minimum the inertia of the parts which are positively connected to the engine gear.

It is another object to provide such a device which is arranged to overrun the driving shaft freely when the engine starts, with no possibility of binding or grabbing; and which demeshes smoothly from the engine gear without any violent impact conducive to rebounding toward meshed position.

Further objects and advantages will be apparent from the following description taken in connection with the accompanying drawing in which:

Fig. 1 is a side elevation partly broken away and in section showing the parts in idle position;

Fig. 2 is an end view of Fig. 1 as viewed from the left;

Fig. 3 is a view similar to Fig. 1 showing the parts in cranking position; and

Fig. 4 is a view similar to Fig. 1 showing the positions of the parts in case of tooth abutment between the pinion and engine gear.

In Fig. 1 of the drawing there is illustrated a power shaft 1 on which a hollow sleeve 2 is rigidly mounted as by means of a cross pin 3. A driving overrunning clutch member 4 is threaded on the end of the sleeve 2 and locked thereon by means of projections 5 on the end of the sleeve which are forced into recesses 6 formed in the clutch member in any suitable manner. Cross pin 3 also traverses the clutch member 4 and is retained therein by suitable means such as a lock ring 7.

The driving clutch member 4 is provided with overrunning clutch teeth 8, and a screw shaft 9 having cooperating overrunning clutch teeth 11 is slidably journalled on the sleeve 2, being retained on the sleeve by a stop nut 12 threaded and staked thereon as illustrated at 13 in position to permit sufficient longitudinal movement of the screw shaft to disengage its teeth 11 from the teeth 8 of the driving clutch member 4.

A pinion member 14 is slidably journalled on the power shaft 1 for longitudinal movement into and out of engagement with a gear 15 of an engine to be started. Pinion 14 is provided with an extended hub portion 16 having an exterior circumferential channel 17 adjacent the toothed portion of the pinion, a tapered portion 18, an intermediate cylindrical portion 19, a second tapered portion 21 adjacent thereto, and a cylindrical portion 22 of smaller diameter than the cylindrical portion 19. A coiled transmission spring 23 is pressed on the hub 16 of the pinion so as to firmly grip the intermediate cylindrical portion 19 and tapered portion 18 thereof, with the end convolution 24 of the spring entering the channel 17 so as to anchor the spring on the pinion.

Means for actuating the pinion through the transmission spring 23 is provided in the form of a nut and barrel member 25 which is threaded at one end on the screw shaft 9 as shown at 26, and has an interior cylindrical surface 27 adjacent its other end in which the spring 23 has a tight press fit, seating against a stop ring 28 in the interior of the barrel. The inner surface 27 of the barrel is preferably relieved adjacent the stop ring 28 to form a channel 29 into which the end convolution of the spring 23 may expand in order to resist withdrawal of the spring from the barrel. The spring 23 is closely wound at both ends but is provided intermediate its length with spaced convolutions as indicated at 33 so as to permit endwise compression of the spring to enforce mesh in case of tooth abutment between the pinion 14 and the engine gear 15.

An anti-drift spring 31 within the barrel 25 is seated at one end on the stop nut 12 and at its other end bears against the nut portion 26 of the barrel so as to normally hold said nut portion against the end 32 of the thread on the screw shaft 9, and maintain the overrunning clutch teeth 8, 11 in engagement.

In operation, starting with the parts in the positions illustrated in Fig. 1, rotation of the power shaft 1 is transmitted through the driving clutch member 4 to the screw shaft 9 whereby the nut and barrel member 26, 25 is traversed to the right, carrying with it the transmission spring 23 and pinion 14 until the pinion is caused to fully mesh with the engine gear 15 at which time the longitudinal travel of the nut 26 is arrested by the stop nut 12. The nut and barrel member is thereupon caused to rotate with the screw shaft, the latter being forced tightly against the driving clutch member 4 by the screw-jack action of the nut and the screw shaft. This rotation is transmitted yieldingly through the spring 23 to rotate the pinion 14 and crank the engine. Spring 23 is wound in such a direction that the torque transmitted therethrough tends to reduce its diameter, thus causing it to firmly grip the hub 16 of the pinion. When a predetermined torque is exceeded, however, the winding-down action of the spring causes it to reduce its frictional engagement with the inner surface 27 of the barrel 25, thus permitting slippage which limits the maximum torque to be transmitted.

When the engine starts, overrunning action of the pinion 14 causes the nut 26 to thread itself back on the screw shaft 9 and the parts are returned to idle position with the assistance of the anti-drift spring 31. When the nut 26 strikes the end of the threads in the screw shaft, the barrel 25, screw shaft 9, and other associated parts overrun the driving clutch member 4, thus inhibiting any tendency of the drive to rebound and cause the pinion 14 to strike against the engine gear 15.

If, during the meshing operation, tooth abutment should occur between the pinion 14 and engine gear 15, the intermediate spaced convolutions 33 of the transmission spring 23 permit the spring to compress as shown in Fig. 4 until sufficient torque has been built up to index the pinion into proper meshing relation with the engine gear 15, whereupon meshing and cracking proceed as usual.

Although but one embodiment of the invention has been shown and described, it will be understood that changes may be made in the design and arrangement of the parts without departing from the spirit of the invention.

I claim:

1. In an engine starter drive a power shaft, a sleeve fixed thereon, a driving overrunning clutch member fixed on the sleeve, a screw shaft and driven overrunning clutch member slidably journalled on the sleeve, a nut and barrel member threaded on the screw shaft, stop means on the sleeve limiting the travel of the nut member away from the driving clutch member, a pinion slidably journalled on the power shaft for movement into and out of mesh with a gear of the engine to be started, and a cylindrical elastic member connected at one end to the interior of the barrel member, and at its other end to the pinion.

2. An engine starter drive as set forth in claim 1 including further a compression spring in the barrel between the nut and the stop means.

3. A starter drive as set forth in claim 1 in which the pinion is provided with an extended hub, and the elastic member is frictionally connected to the barrel and pinion hub.

4. A starter drive as set forth in claim 1 in which the middle portion of the elastic member is longitudinally compressible.

5. A starter drive as set forth in claim 1 in which the elastic member is in the form of a coiled spring bearing frictionally in the interior of the barrel member and on the exterior of the pinion hub, and so arranged that the torque transmitted therethrough in cranking the engine tends to wind the spring more tightly so as to reduce its diameter.

6. An engine starter drive as set forth in claim 1 in which the overrunning clutch members are provided with inter-engaging teeth which are forced together by the thrust of the screw shaft when the nut engages the stop means on the sleeve.

JAMES J. DIGBY.

REFERENCES CITED

The following references are of record in the file of this patent:

UNITED STATES PATENTS

| Number | Name | Date |
|---|---|---|
| 1,984,297 | Abell | Dec. 11, 1934 |